United States Patent
Callard

(10) Patent No.: US 10,506,560 B2
(45) Date of Patent: Dec. 10, 2019

(54) METHOD AND APPARATUS FOR CONTROL LAYER COMMUNICATION BETWEEN NETWORK NODES HAVING MULTIPLE INTERFACES

(71) Applicant: Aaron James Callard, Ottawa (CA)

(72) Inventor: Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/724,724

(22) Filed: Oct. 4, 2017

(65) Prior Publication Data

US 2019/0104508 A1 Apr. 4, 2019

(51) Int. Cl.
| | | |
|---|---|---|
| H04W 72/04 | (2009.01) | |
| H04L 12/46 | (2006.01) | |
| H04L 29/06 | (2006.01) | |
| H04W 72/10 | (2009.01) | |
| H04W 76/10 | (2018.01) | |

(52) U.S. Cl.
CPC ....... *H04W 72/0406* (2013.01); *H04W 72/10* (2013.01); *H04W 76/10* (2018.02)

(58) Field of Classification Search
CPC .......................... H04W 72/0406; H04W 72/10
See application file for complete search history.

(56) References Cited

U.S. PATENT DOCUMENTS

| | | |
|---|---|---|
| 9,178,828 B2 | 11/2015 | Kumar et al. |
| 2016/0070588 A1 | 3/2016 | Zhang et al. |
| 2017/0264462 A1 | 9/2017 | Chitrapu et al. |
| 2018/0077050 A1* | 3/2018 | Tiruveedhula ...... H04L 12/4641 |
| 2018/0262598 A1* | 9/2018 | Zhang .................... H04L 69/22 |

FOREIGN PATENT DOCUMENTS

| | | |
|---|---|---|
| CA | 103917967 A | 7/2014 |
| WO | 2006084625 A1 | 8/2006 |

* cited by examiner

*Primary Examiner* — Kiet Tang

(57) ABSTRACT

A method, apparatus and system for transmitting control plane messages in a communication network. Messaging is between two logical nodes, e.g. gNBs. Logical nodes include multiple networked sub-entities. Multiple sub-interfaces couple a pair of logical nodes. One sub-interface is selected based on keys associated with content of a message. Key-to-sub-interface associations are stored in memory. The keys may be identifiers included in the control plane message, such as UE IDs, Cell IDs, etc. Packets carrying the control plane message are configured and transmitted using the selected sub-interface. A key-to-sub-interface association may be established or updated when a control plane message is received via the sub-interface and includes the key, or in response to a rejection message specifying the correct sub-interface to use. A middle box entity may be provided in a logical node for each sub-interface and configured to act at least initially to forward messages to appropriate sub-entities.

24 Claims, 12 Drawing Sheets

METHOD AND APPARATUS FOR CONTROL LAYER COMMUNICATION BETWEEN NETWORK NODES HAVING MULTIPLE INTERFACES

FIELD

The present disclosure relates to communication networks. In particular, the present disclosure relates to a method and apparatus for control layer communication in communication networks such as wireless communication networks, and more particularly 3GPP 5G networks.

BACKGROUND

The $3^{rd}$ Generation Partnership Project (3GPP) has, as part of the $5^{th}$ Generation (5G) New Radio (NR) study item, proposed the use of a generalized NodeB (gNB) as a base station, and as an evolution to the eNB of the Long Term Evolution (LTE) standard. It has been proposed that a gNB (or other logical node) can be made up of a significant number sub-entities connected by a network and able to exchange messages in the control plane. The coverage area of a gNB can be large, and the sub-entities may be distributed both geographically and in the network, for example with various sub-entities dealing with particular cell-specific or UE-specific (or UE-type) communications. Various electronic devices (EDs) may communicate with each other, and the communications may be distinguished based on the types of EDs involved. Communication corresponding to a particular ED type can be referred to as ED-type communication.

The Stream Control Transmission Protocol (SCTP) as defined in the 3GPP standards documents, can be an interface between gNBs. SCTP can also be used for communication between a gNB and other nodes, such as 3GPP-defined nodes, or possibly between different pairs of nodes, such as 3GPP-defined nodes. Nodes may include an Access and Mobility Management Function (AMF), a Session Management Function (SMF), or Wireless Local Area Network (WLAN) nodes, etc. In the 5G NR discussions, support for multiple SCTP interfaces between two different gNBs has been accepted as a possibility. However, there is potential to improve the effective use of these interfaces. This is particularly the case in scenarios where logical entities of a network are geographically spread out, leading to potential communication delay for control signaling.

Therefore there is a need for methods and systems for control layer communications between network nodes that obviate or mitigate one or more limitations of the prior art, such as the need to route communications through certain dedicated interface nodes, which can result in bottlenecks.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present disclosure, there is provided an apparatus, system, and method for control layer communications between network nodes having multiple interfaces, such as between sub-entities of logical network nodes, the logical network nodes having multiple sub-entities and being connected by multiple sub-interfaces.

Embodiments of the present invention provide for a method for operating an apparatus of a wireless communication network to transmit a control plane message. The method includes selecting a sub-interface from a plurality of available sub-interfaces, where the plurality of available sub-interfaces couple a logical node comprising the apparatus with another logical node. The sub-interface is selected based on one or more keys associated with content of the control plane message. The method further includes configuring one or more packets to carry the control plane message using the selected sub-interface. The method further includes transmitting the one or more packets using the selected sub-interface.

Embodiments of the present invention provide for an apparatus operating in a wireless communication network. The apparatus is configured, in response to a trigger to transmit a control plane message, to select a sub-interface from a plurality of available sub-interfaces, the plurality of available sub-interfaces coupling a logical node corresponding to the apparatus to another logical node, wherein the sub-interface is selected based on one or more keys which are associated with content of the control plane message. The apparatus is further configured to configure one or more packets to carry the control plane message using the selected sub-interface. The apparatus further configured to transmit the one or more packets using the selected sub-interface.

In some embodiments, association between the selected sub-interface and the one or more keys is set in response to a prior control plane message received by the logical node from the other logical node. In some embodiments, the prior control plane message causes the trigger to transmit the control plane message. In some embodiments, the prior control plane message is transmitted over the selected sub-interface and includes the one or more keys. In some embodiments, the prior control plane message is an explicit instruction to associate the selected sub-interface with the one or more keys, or wherein the prior control plane message is a response to a further prior control plane message transmitted from the apparatus using a different sub-interface. In some embodiments, the one or more keys include one or more of: a UE ID; a cell ID; a network slice ID; a PDU session ID; a message type; and an interface type. In some embodiments, the one or more keys are included in the control plane message. In some embodiments, the apparatus is a sub-entity of the logical node. In some embodiments, the selected sub-interface is an interface with a sub-entity, of the other logical node, that is a final recipient of the control plane message. In some embodiments, two or more keys are associated with the message, each of the two or more keys or combinations thereof associated with a different one of the plurality of available sub-interfaces, and wherein selecting the sub-interface comprises selecting the sub-interface corresponding with a highest priority one of the two or more keys or combinations thereof.

Embodiments of the present invention provide for a gNB comprising the apparatus as described above wherein the gNB is the above-mentioned logical node.

Embodiments of the present invention provide a method for operating an apparatus of a wireless communication network to transmit a control plane message. The method includes receiving a first control plane message via a sub-interface belonging to a plurality of available sub-interfaces, the plurality of available sub-interfaces coupling a logical node comprising the apparatus with another logical node.

The method further includes extracting one or more keys associated with content of the control plane message. The method further includes storing an association between the one or more keys and the sub-interface. The method further includes subsequently using the sub-interface to transmit a second control plane message associated with at least one of the one or more keys.

Embodiments of the present invention provide for a method for operating an apparatus of a wireless communication network. The method includes receiving a control plane message via a sub-interface belonging to a plurality of available sub-interfaces, the plurality of available sub-interfaces coupling a logical node comprising the apparatus with another logical node. The method further includes determining that the sub-interface was incorrectly selected for use in transmitting the control plane message. The method further includes transmitting a rejection message toward an apparatus transmitting the control plane message, the rejection message indicative that that the sub-interface was incorrectly selected for use in transmitting the control plane message. In some embodiments, the method further includes determining a second sub-interface appropriate for transmitting the control plane message, wherein the rejection message includes an indication of the second sub-interface.

Embodiments of the present invention provide for a method for operating an apparatus of a wireless communication network. The method includes receiving a control plane message via a sub-interface belonging to a plurality of available sub-interfaces, the plurality of available sub-interfaces coupling a logical node comprising the apparatus with another logical node. The method further includes determining that the sub-interface was incorrectly selected for use in transmitting the control plane message. The method further includes forwarding the control plane message to a recipient sub-entity. In some embodiments, the method further includes transmitting a notification message toward an apparatus transmitting the control plane message, the notification message indicative that that the control plane message is being forwarded to the recipient sub-entity.

Embodiments of the present invention provide for a method for operating an apparatus of a wireless communication network. The method includes receiving a control plane message via an interface or sub-interface coupling a logical node comprising the apparatus with another logical node. The method further includes determining a sub-entity of the logical node to receive the control plane message. The method further includes forwarding the control plane message to the determined sub-entity. In some embodiments, the method further includes transmitting a notification message toward an apparatus transmitting the control plane message, the notification message indicative that that the control plane message is being forwarded to the determined sub-entity.

Embodiments of the present invention provide for a method for operating an apparatus of a wireless communication network. The method includes receiving a control plane message via a sub-interface coupling a logical node comprising the apparatus with another logical node. The method further includes determining a sub-entity of the logical node to receive the control plane message. The method further includes forwarding the control plane message to the determined sub-entity.

Embodiments of the present invention provide for a method for performing control plane communication in a wireless communication network. The method includes receiving a control plane message at a first sub-entity of a first logical node of the wireless communication network, the control plane message transmitted from a sub-entity of a second logical node via a standardized interface between the first logical node and the second logical node, the first sub-entity designated for receiving control plane messages via the standardized interface. The method further includes identifying a second sub-entity of the first logical node as a recipient of the control plane message. The method further includes forwarding the control plane message to the second sub-entity via an internal interface of the first logical node. In some embodiments, the method further includes receiving, at the first sub-entity, a response to the control plane message from the second sub-entity; and forwarding the response from the first sub-entity to the sub-entity of the second logical node via the standardized interface. In some embodiments, the method further includes transmitting a response to the control plane message from the second sub-entity to the sub-entity of the second logical node, the response bypassing the first sub-entity. In some embodiments, the method further includes transmitting, from the first sub-entity to the sub-entity of the second logical node, a notification that the control plane message is being forwarded to the second sub-entity.

Embodiments of the present invention provide for an apparatus configured to perform operations corresponding to the methods described above or elsewhere herein.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

As noted above, a gNB can potentially include a large number of geographically separate sub-entities. Different sub-entities may perform different sets of operations of a gNB to which they belong, and the sub-entities can be networked together. Thus, the gNB can be formed of components distributed over a significant geographic area. For example, a gNB may, in some implementations, cover a large geographic area, and include sub-entities which handle cell-specific communication, or ED-type (e.g. UE-type) communication, or both, e.g. in different geographic sub-areas. In some embodiments, different sub-entities may handle different communication types. Example sub-entities of the gNB include a Control Unit (CU) or other unit handling configuration and upper layer operations of the gNB, and a Distributed Unit (DU) or other unit handling scheduling and lower layer operations of a gNB. Other example sub-entities of the gNB include a Transmission/Reception Point (TRP), physical communication equipment comprising an antenna, a scheduler, etc. Sub-entities (e.g. a CU in the network core and a DU at the network edge) may be distributed such that signal propagation between them is on the order of several milliseconds. The network is typically a wireless communication network comprising a radio access portion and a core network portion, such as a 3GPP 5G network.

As used herein, a logical node is considered to be a communication network node, for example as defined by 3GPP or another standardization body, the node having one or more sub-entities that are networked together. A gNB is a potential example of a logical node as defined herein. This is because the gNB can include multiple, potentially dispersed sub-entities operating together. Other potential examples of logical nodes include but are not limited to an AMF, an SMF, a Mobility Management Entity (MME), and an evolved nodeB (eNB). The exact make up of the logical node and its sub-entities is expected to potentially change from one deployment to another and from one standards or software release to another. A logical node may comprise a plurality of networked sub-entities as part of efforts to virtualize the functions of the logical node, for example. Different logical nodes can operate in overlapping areas, for example using different carrier frequencies. This may occur when one logical node is a small cell, such as an indoor radio node, while another relates to a macro-cell, or when one logical node is associated with customer premise equipment while another provides mobile network radio access network communication operation. Different logical nodes can potentially be associated with different radio access technologies in a multiple radio access technology (RAT) implementation.

It can be desirable for the logical node, when interacting with other external network nodes, to appear as if it is a single node, rather than relying on distributed virtualized functions for its operation.

Figure 1:
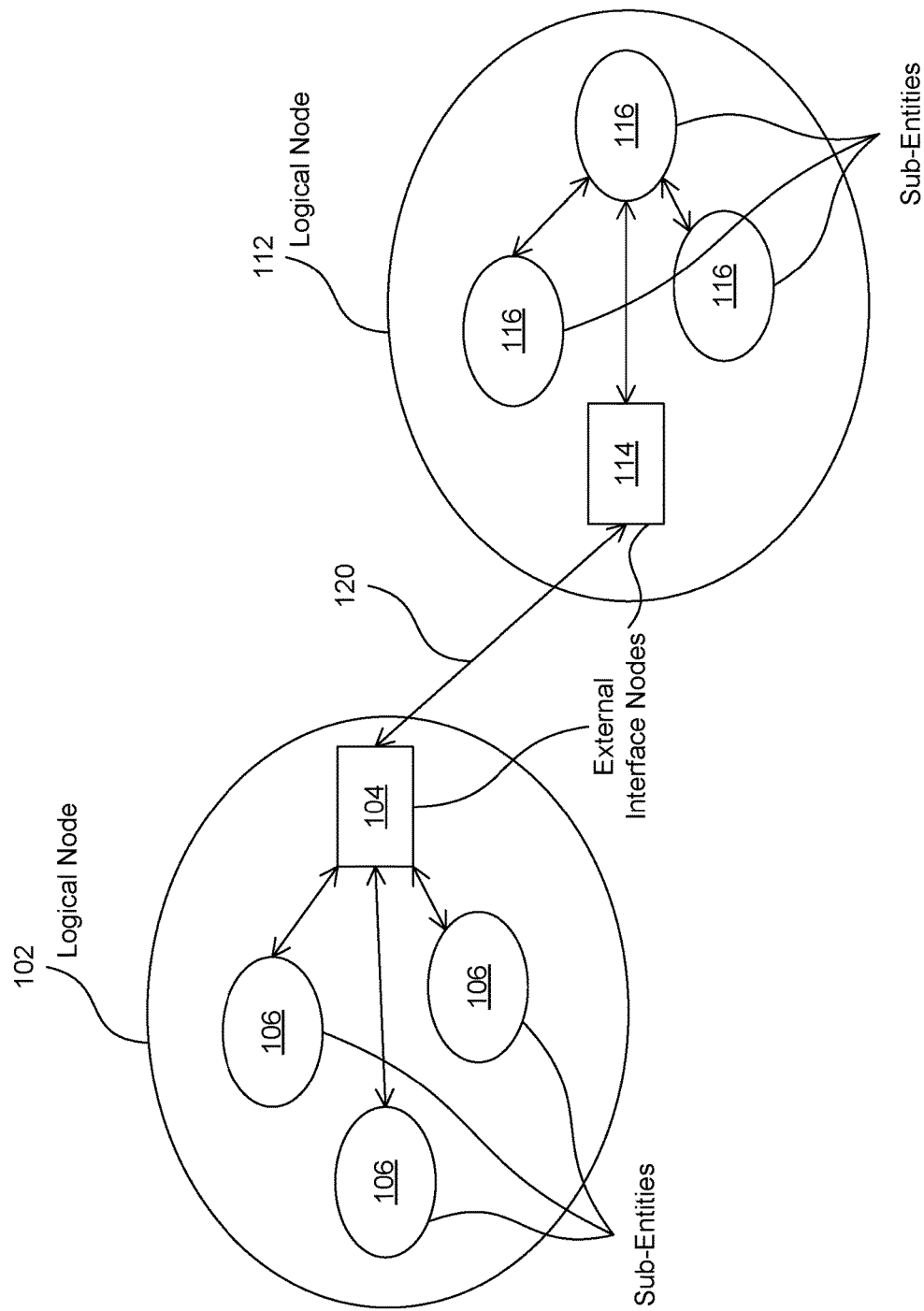
FIG. 1 illustrates a network architecture contrasting with embodiments of the present invention.

It can be desirable for a sub-entity of one logical node to communicate with another logical node or with a sub-entity of another logical node. This is in addition to sub-entities of the same logical node being able to communicate. This can occur during handover, for example. Furthermore, it can be desirable that the communication between sub-entities of different nodes be as direct as possible. In a proposed network architecture contrasting with embodiments of the present invention, as illustrated in FIG. 1, each pair of logical nodes 102, 112 (e.g. gNB) is connected via a single interface 120, such as an SCTP interface. Communications between all sub-entities 106 belonging to a first logical node 102 and all sub-entities 116 belonging to a second logical node 112 would be carried over this single interface. The interface may correspond to Transport Network Layer (TNL) communication between an external interface node 104 of the first logical node 102 and an external interface node 114 of the second logical node 112. The external interface nodes act to receive and forward communications to and from all other nodes of the logical node to which they belong. This would result in a bottleneck, particularly as the number of sub-entities of the logical nodes increased.

Control plane communication protocols in LIE and 5G can include S1-AP and X2-AP protocols, for example. Communication using such protocols can be pipelined on a per-UE or per-base station basis. Support for multiple SCTP interfaces has been accepted for 5G in principle, however these multiple interfaces operate toward a single logical entity which has access to a single shared state. That is, to date there has been no consideration of race conditions of selection from multiple SCTP interfaces.

Figure 2:
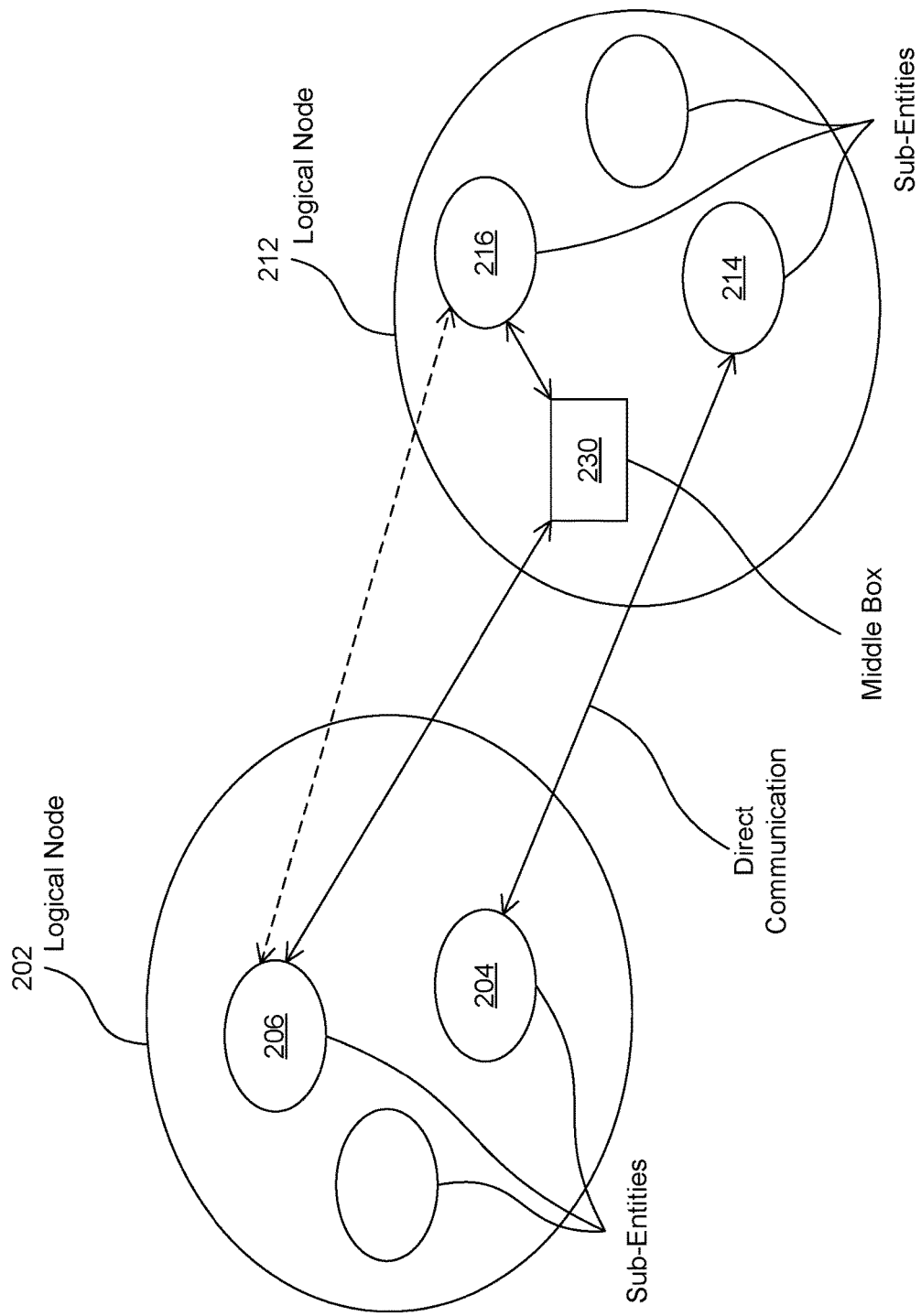
FIG. 2 illustrates a network architecture according to embodiments of the present invention.

In contrast, and with reference to FIG. 2, embodiments of the present invention provide for direct communication to sub-entities of different logical nodes 202, 212 (e.g. gNBs), or from sub-entities of different logical nodes 202, 212, or both to and from such sub-entities, rather than using external interface nodes. As used herein, each sub-entity may have its own TNL address, and hence can potentially transmit and receive messages via the TNL. In some embodiments, sub-entities of different logical nodes communicate directly, for example as illustrated between sub-entities 204 and 214. In other embodiments, sub-entities of different logical nodes communicate through a network node referred to herein as a middle box. The middle box can be located in the logical node of the sub-entity that does not initiate the communication. For example, sub-entity 206 can initiate communication with sub-entity 216, the communication at least initially being mediated by a middle box 230. In some embodiments, sub-entities initially communicate through a middle box but after the initial communication the sub-entities communicate directly (e.g. as shown by broken line between sub-entities 206 and 216). In some embodiments, at least one middle box is provided and used. In some embodiments, plural middle boxes are provided and used. For example, a logical node having N sub-interfaces usable for communication may include up to N middle boxes, each associated with at least one of the N sub-interfaces.

Each sub-interface may be associated with a set of TNL parameters, such as parameters indicative of an SCTP socket (or SCTP interface; and SCTP socket uses an SCTP interface), or parameters indicative of a TCP socket, or SCTP stream, or other channel over which communication can occur. The sub-interface can refer to a mapping of TNL addresses. The mapping can be a direct mapping, for example in which case a sub-interface may be a TNL parameter. The mapping can be an indirect mapping, using transport layer parameters.

According to some embodiments of the present invention, sub-entities of one logical node can communicate directly with a middle box of another logical node. By providing multiple middle boxes in a given logical node, or disintermediating a middle box from an ongoing communication session (e.g. as soon as possible after use of the middle box for establishing an initial connection between sub-entities), or by both providing middle boxes and subsequently disintermediating the middle box, demand on each middle box can be reduced. The sub-entities may each have their own TNL parameters. Therefore, each sub-entity is addressable by other entities in the network (e.g. other logical nodes or sub-entities thereof), provided that its TNL parameters are known.

It is recognized herein that allowing communication with (i.e. to, from, or both to and from) sub-entities of a logical node to be more direct can potentially improve network operation. This situation is illustrated in FIG. 2 and is contrasted with the use of a single SCTP interface linking two logical nodes as in FIG. 1. Multiple sub-interfaces can be provided between logical nodes and used to support control layer communication with sub-entities. The provision of multiple sub-interfaces can, in some scenarios, increase bandwidth, reduce channel delay, reduce bottlenecks, provide redundancy to guard against failure, or a combination thereof. The need for interface nodes to relay communications as in FIG. 1 is mitigated. Logical node scalability may also be improved, for example allowing a gNB to be instantiated over a larger geographic area, due to the lack of bottleneck links and the more distributed nature of communication between sub-entities.

However, in scenarios involving multiple communicating (e.g. transmitting, receiving, or both transmitting and receiving) sub-entities of different logical nodes and multiple sub-interfaces between the logical nodes, it becomes desired to prescribe how the sub-entities will use the sub-interfaces. To address this, embodiments of the present invention provide for a method and apparatus for performing control layer communication among network sub-entities. This includes selecting a sub-interface for use by a sub-entity for control-layer communication with another logical node (or sub-entity thereof). In various embodiments, control plane messages on logical channels are mapped to particular interfaces based on topic of the messages, content of the messages, or both topic and content of messages.

Embodiments of the present invention avoid problems with using a basic SCTP architecture to communicate between sub-entities of logical nodes. In the basic architecture, responses are transmitted on the same stream (e.g. same TNL address) as a corresponding request. However, SCTP only has one primary path at a time but may retransmit to alternate TNL addresses, for example by changing the primary path over time. In some embodiments, responses may be transmitted using multiple packets, with retransmission performed on a per-packet basis. This can result in the multiple packets carrying a single message being sent to different TNL addresses. Although packets received at the wrong node can conceivably be forwarded, this would require correct forwarding information. Because the only piece of information guaranteed to be in every such SCTP packet is the stream ID (in current proposed implementations), each (e.g. virtual) sub-entity of a logical node would, in various embodiments, be required to track correspondences between stream IDs and TNL addresses, which can be intensive and complex. Embodiments of the present invention may address this issue by providing a less intensive approach.

Embodiments of the present invention can be used to address the problem of communication delay for control signaling when logical entities are geographically distributed. Communication on logical channels can be mapped to different interfaces based on messages sent, messages to be sent, or based on both messages sent and messages to be sent. The mapping may be performed based on explicit messaging, implicit messaging, or using implementation-only solutions.

Figure 3:
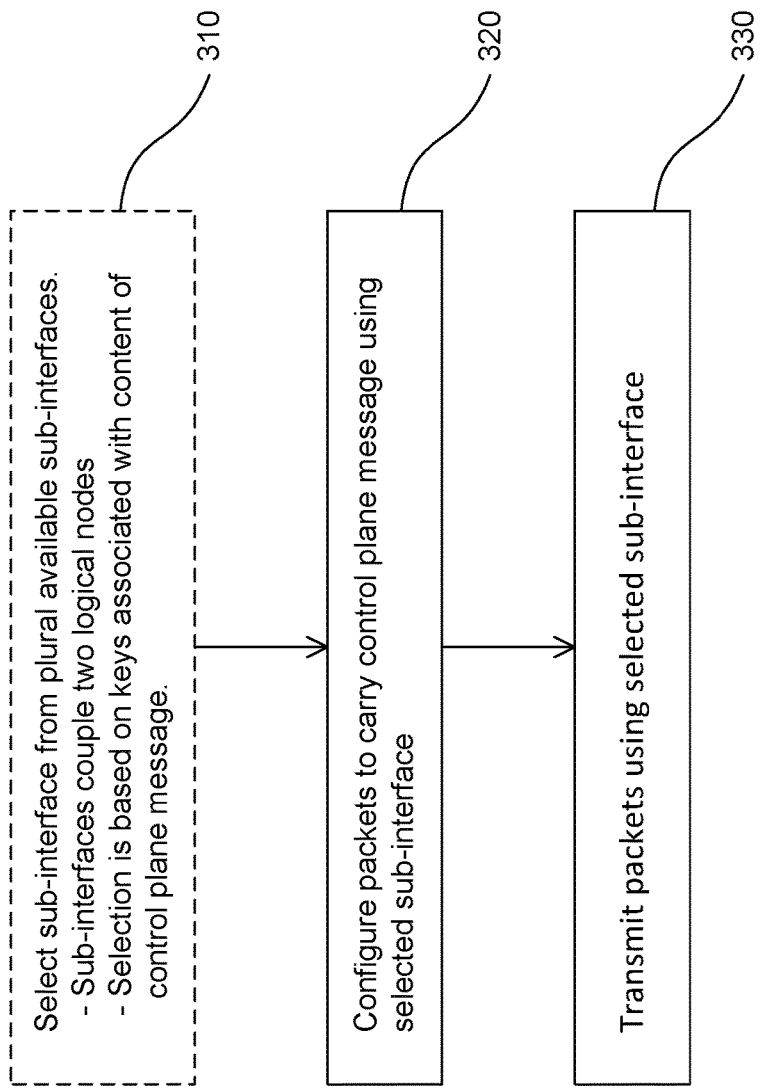
FIG. 3 illustrates a method for operating an apparatus of a wireless communication network to transmit a control plane message, in accordance with embodiments of the present invention.

According to an embodiment of the present invention, and with reference to FIG. 3, there is provided a method 300 for operating an apparatus of a wireless communication network to transmit a control plane message. The method optionally includes selecting 310 a sub-interface from a plurality of available sub-interfaces. Alternatively, the sub-interface may be pre-selected, e.g. by the apparatus prior to performing the method 300. The available sub-interfaces couple together (are usable for communication between) two logical nodes: a first logical node corresponding to the apparatus, and another logical node. The first logical node (e.g. a gNB) includes the apparatus as a sub-entity. The sub-interface is selected based on one or more keys which are associated with content of the control plane message. The method further includes configuring 320 one or more packets to carry the control plane message using the selected sub-interface. The method further includes transmitting 330 the one or more packets using the selected sub-interface.

Figure 4:
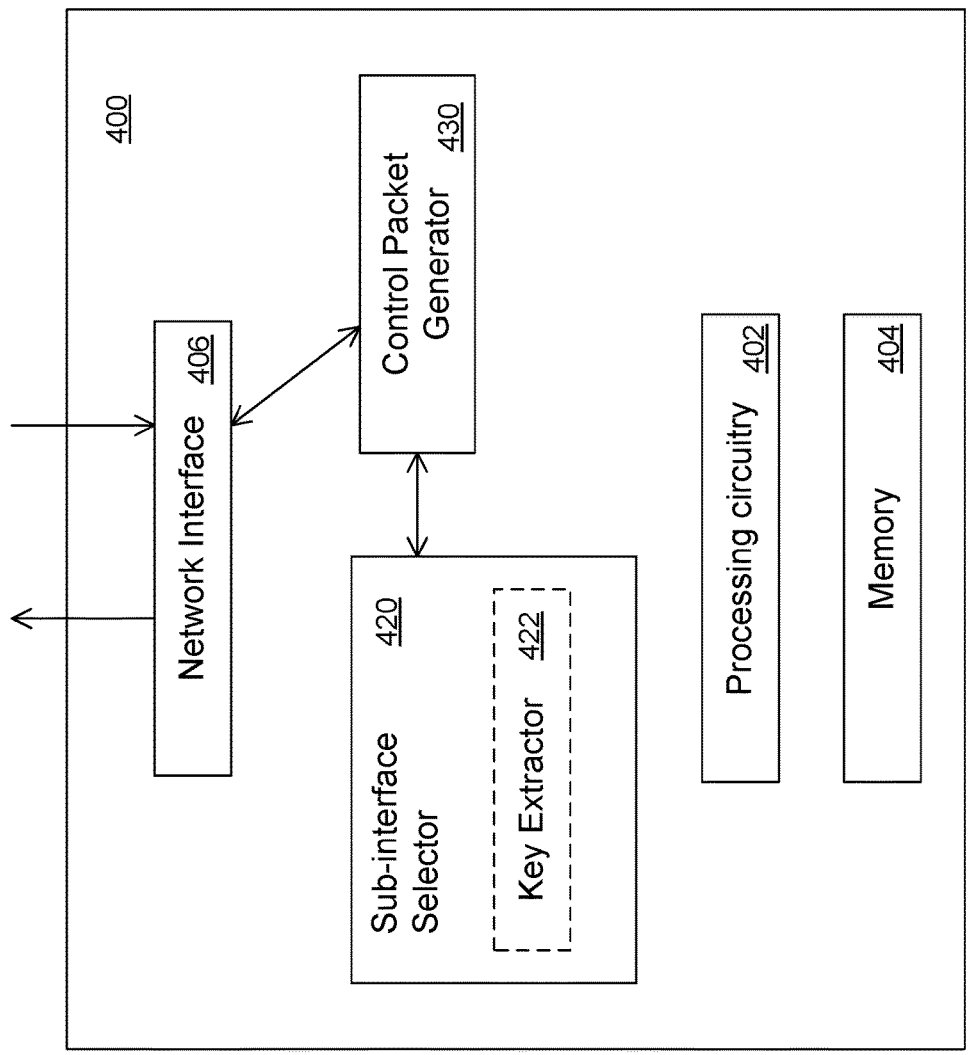
FIG. 4 illustrates an apparatus operating in a wireless communication network, in accordance with embodiments of the present invention.

According to another embodiment of the present invention, and with reference to FIG. 4, there is provided an apparatus 400 operating in a wireless communication network. The apparatus includes processing circuitry 402, a memory 404, and a network interface 406. The apparatus is configured, in response to a trigger to transmit a control plane message, to select, for example using a sub-interface selector 420, a sub-interface from a plurality of available sub-interfaces. The plurality of available sub-interfaces couple a logical node corresponding to the apparatus to another logical node. The sub-interface is selected, by the sub-interface selector 420, based on one or more keys which are associated with content of the control plane message. In one embodiment, the association between the keys and the sub-interfaces can include a key extractor 422. The key extractor 422 is configured to extract keys from, or otherwise associate keys with, the control plane message. The extracted keys are then used in a memory lookup operation performed by the sub-interface selector. Association between the keys and the sub-interfaces may be stored in the memory 404. The apparatus further configures, using a control packet generator 430, one or more packets to carry the control plane message using the selected sub-interface. The apparatus further transmits, using the network interface 406, the one or more packets, the packets configured and transmitted so that they are communicated using the selected sub-interface. The memory 404 may be local to the apparatus 400, or shared with other similar apparatuses and coupled to the apparatus 400 via the network interface 406.

The apparatus 400 is a sub-entity of a first logical node. The apparatus may be configured to select sub-interface parameters from a plurality of available sub-interface parameters stored in the memory. The sub-interface parameters are selected based on one or more keys which are associated with (e.g. included in) content of the control plane message. The sub-interface parameters are usable for transmitting the control plane message on a corresponding one of a plurality of sub-interfaces communicatively coupling the apparatus to the second logical node or the sub-entity of the second logical node. Selecting the sub-interface parameters may comprise determining the keys, and performing a lookup operation on the memory, the lookup operation specifying the keys and configured to return the associated sub-interface parameters.

Figure 5:
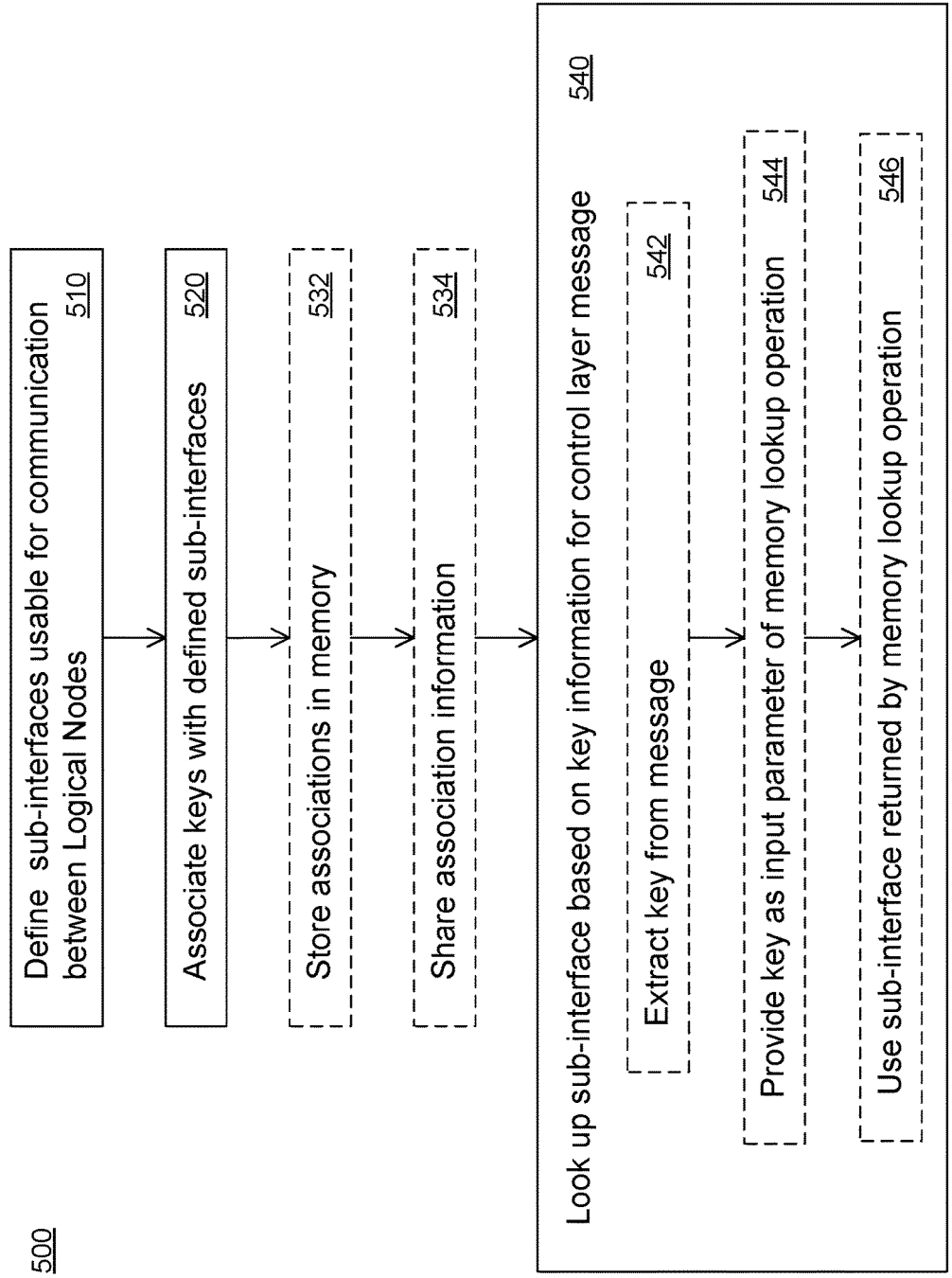
FIG. 5 illustrates associations between keys and sub-interfaces, in accordance with embodiments of the present invention.

As mentioned above, sub-interface selection can be based on keys which are associated with content of a control plane message to be transmitted. Embodiments of the present invention therefore include association of keys with sub-interfaces, also referred to as key association 500, which is described as follows, with reference to FIG. 5. The key association is used to map a control plane message to a sub-interface that is appropriate for transmitting the message. This can be done on a message-by-message basis.

First, one or more sub-interfaces usable for communication between logical nodes are defined 510. The sub-interface may correspond for example to TNL parameters which are usable to address packets to another logical node. The sub-interfaces may be defined during a discovery phase, in which a new connection between two logical nodes is created. The TNL address of a new sub-interface can be assigned by a trusted third party, for example.

Next, one or more keys are associated 520 with each defined sub-interface. The keys are parameters or sets of parameters which characterize a potential communication involving a sub-entity and a logical node not containing the sub-entity, or involving a pair of sub-entities belonging to different logical nodes. For example, for an Xn interface, a key may include one or a combination of relevant IDs such as a PDU session ID, UE ID, and Cell ID. In one embodiment, the associations between keys and sub-interfaces are stored in memory, for example in a lookup table. Each entity (e.g. logical node or sub-entity) may be provided with access (e.g. local access) to memory storing at least the associations potentially relevant to that entity.

In some embodiments, the associations can be stored 532 in a computer memory accessible to multiple entities. In other embodiments, each entity may maintain its own internal memory storing a copy of the associations. Associations stored locally by different sub-entities are not necessarily identical.

In some embodiments, entities may share 534 association information with each other. For example, a first sub-entity may transmit a query to another sub-entity requesting information on whether an association already exists between a sub-interface and key information (specified in the query). A response to the query may indicate the associated sub-interface.

Examples of parameters making up part or all of a key include: network slice ID, a PDU session ID, a UE ID, a Cell ID, a Message type, and a default interface. Network slice ID may be a relevant parameter for networks using a Next-Generation Core (NG-C) configuration, as specified by 3GPP. A key value may be based on one or more of such parameters. A key value may be based on part of a parameter. For example, a key value may be based a subset of the digits or bits of a UE ID.

In some embodiments, keys can be expressed as fixed values or as logical expressions operating on known fields. For example, an eNB UE X2AP ID field may have a mapping based on a wildcard expression of the first few bits of the ID field. This mapping can be expressed using bitmasks and values.

When an entity (e.g. a logical node or sub-entity) has a control layer message to transmit to another logical node (or sub-entity thereof), it uses a key associated with the message to look up 540 the associated sub-interface. The key can be extracted 542 from the message. For example, in a control plane message relating to handover (e.g. handover request) of a UE to a particular cell, the cell ID, and UE ID can be extracted from the message and used together as the key. The key can be provided 544 as input parameters of a memory lookup operation. If an association involving the key is stored in memory, the lookup operation returns an indication of a sub-interface that has previously been associated with the key, and the associated sub-interface is used 546. Otherwise, a new association between the key and a selected sub-interface may be made and the new association may be stored in memory.

According to some embodiment, a key association architecture includes three phases, namely a discovery phase; a new transaction/association phase; and a continued association phase. In the discovery phase, a new connection between two logical nodes (or possibly sub-entities) is created and communication is established. The TNL parameters (e.g. TNL address) of this new connection can be assigned by a trusted third party (e.g. DNS), for example. The discovery phase may comprise performing an explicit key association as described elsewhere herein.

In the new transaction/association phase, a new transaction between two logical nodes is initiated. The transaction is new in that no context associated with this transaction between the two nodes exists yet. When a new message/transaction is initiated, the sub-entity may consult its stored associations between keys and sub-interfaces. If it is determined that no stored association exists for the new message/transaction (i.e. due to a lookup operation specifying key values thereof failing to identify a sub-interface), a default interface is used. If no interface exists between the sub-entity and the destination logical node, an interface can be created. For example, interface creation may include a SCTP connection operation, followed by an interface establishment operation (e.g. using an S1-AP initialize message or another message for associating a new SCTP socket to a logical interface). The new transaction/association phase may comprise performing an implicit key association as described elsewhere herein. The key association is implicit because a key value is associated with a particular sub-interface without receiving an explicit instruction identifying the sub-interface. Rather, the sub-interface via which the message is received is identified and taken as the sub-interface to associate with the key value.

In the continued transaction phase, a transaction which already has a stored association between a key and a sub-interface is initiated. The context of the key is maintained.

After a mapping from key values to an associated sub-interface has been determined, data transfer can be performed. The data transfer occurs through messages. This may correspond, for example, to a complete set of Application Protocol (AP) information elements (IEs) in ASN.1 format. If multicast messaging is permitted, then multiple sub-interfaces may be associated with the same key values. In this case, a transaction identifier may be added to messages to inhibit duplicate messages from being interpreted as multiple separate signals.

As stated above, key associations (stored in memory) are used to select a sub-interface on which to transmit a control plane message, based on keys associated with content of the message. An association between a key and a sub-interface can be made or updated implicitly, explicitly, in response to a redirect operation, or a combination thereof.

Figure 6:
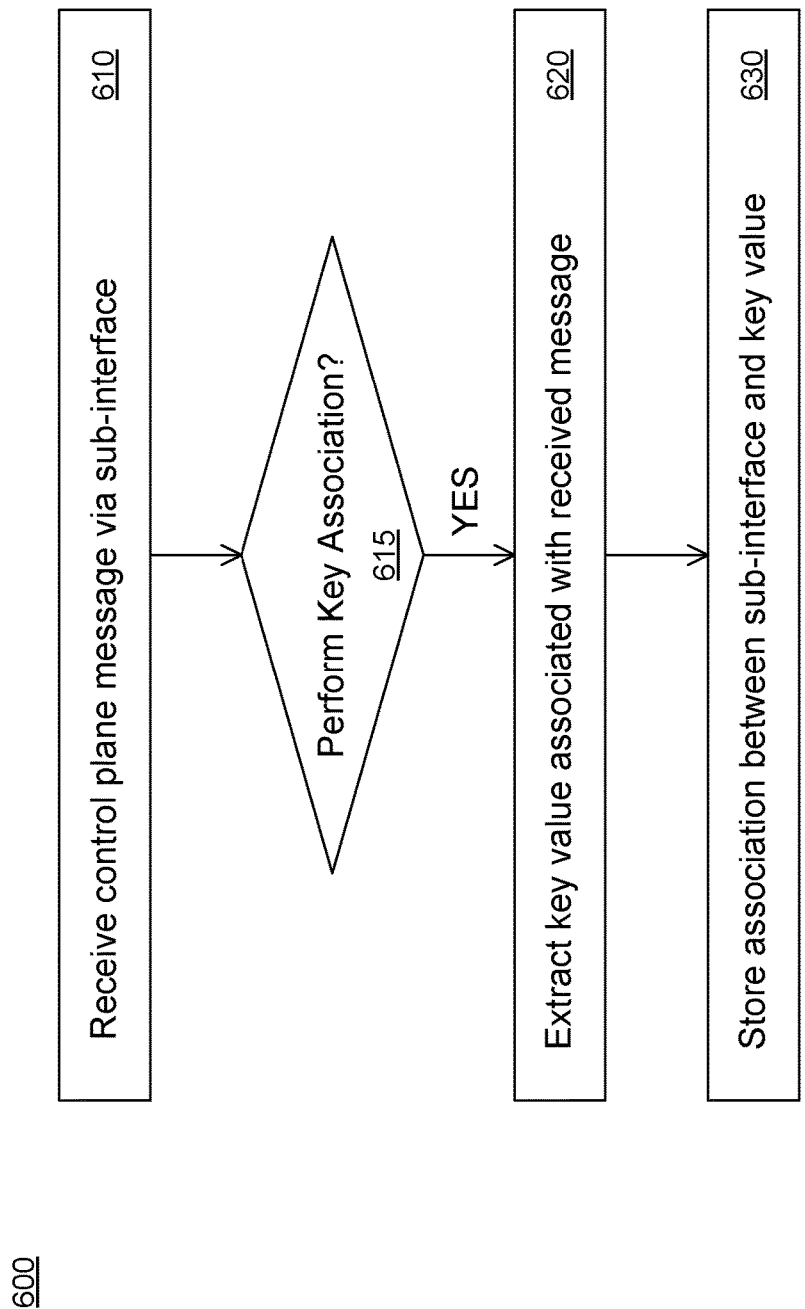
FIG. 6 illustrates implicit associations between keys and sub-interfaces, in accordance with other embodiments of the present invention.

For implicit key association 600, as illustrated in FIG. 6, when a control plane message is received 610 via a particular sub-interface, a key value associated with the received message (e.g. carried in the received data) is extracted 620 and an association is stored 630 in memory, the association being related to both the particular sub-interface and the key value. The extraction and association may be performed by the sub-entity in receipt of the message. As such, an association (e.g. a binding) is formed between the key value and the sub-interface. Subsequently, when an outgoing control plane message associated with the key value is sent, the associated sub-interface is used for the transmission. In this way, the same sub-interface tends to be used for both transmitting and receiving control plane data related to a given key value. In some embodiments this association may be indicated to other entities (sub-entities or otherwise).

In some embodiments, additional signaling may be present in the control plane message to control whether implicit key association is performed in response to receipt of the control plane message. The signaling can prompt or inhibit the key association. In one embodiment, a field (e.g. a one-bit flag) is present in each control plane message. When the flag is set, the receiving sub-entity performs implicit key association. When the flag is not set, the receiving sub-entity does not perform implicit key association. In another embodiment, an optional "associate" field is defined, and a sub-entity in receipt of a control plane message is configured to perform implicit key association when the field is present, and otherwise refrains from same. In another embodiment, an optional "do not associate" field is defined, and a sub-entity in receipt of a control plane message is configured to perform implicit key association when the field is absent, and otherwise refrains. As such, and with reference to FIG. 6, a determination 615 may be made regarding whether to perform key association.

For explicit key association, associations between key values and sub-interfaces is generated by a particular entity and the generated associations are stored in the memory. As such, the associations between key values and sub-interfaces is explicitly signalled. The associations can be performed and updated at substantially any time. Associations can be specified during the creation of a new interface, and may apply to keys (e.g. cell IDs) which potentially exist over the lifetime of the interface. Associations can be performed intermittently to provide semi-static key associations. An example of an explicit key association is an instruction that any control plane message using a given cell ID is to be transmitted using a specified sub-interface.

As an example, a gNB (or other logical node) may indicate that a particular sub-interface should be used for a particular cell ID. In one embodiment, this can be indicated in IE fields as part of an interface creation message, an interface modification message, or another message. A new message explicitly for this purpose may be defined. Explicit key association may therefore include transmitting a key association message from a controlling entity such as a logical node to a sub-entity, the key association message indicative of an association between specified key values and a specified sub-interface; and upon receipt of the key association message at a sub-entity, storing the key association in memory.

Figure 7:
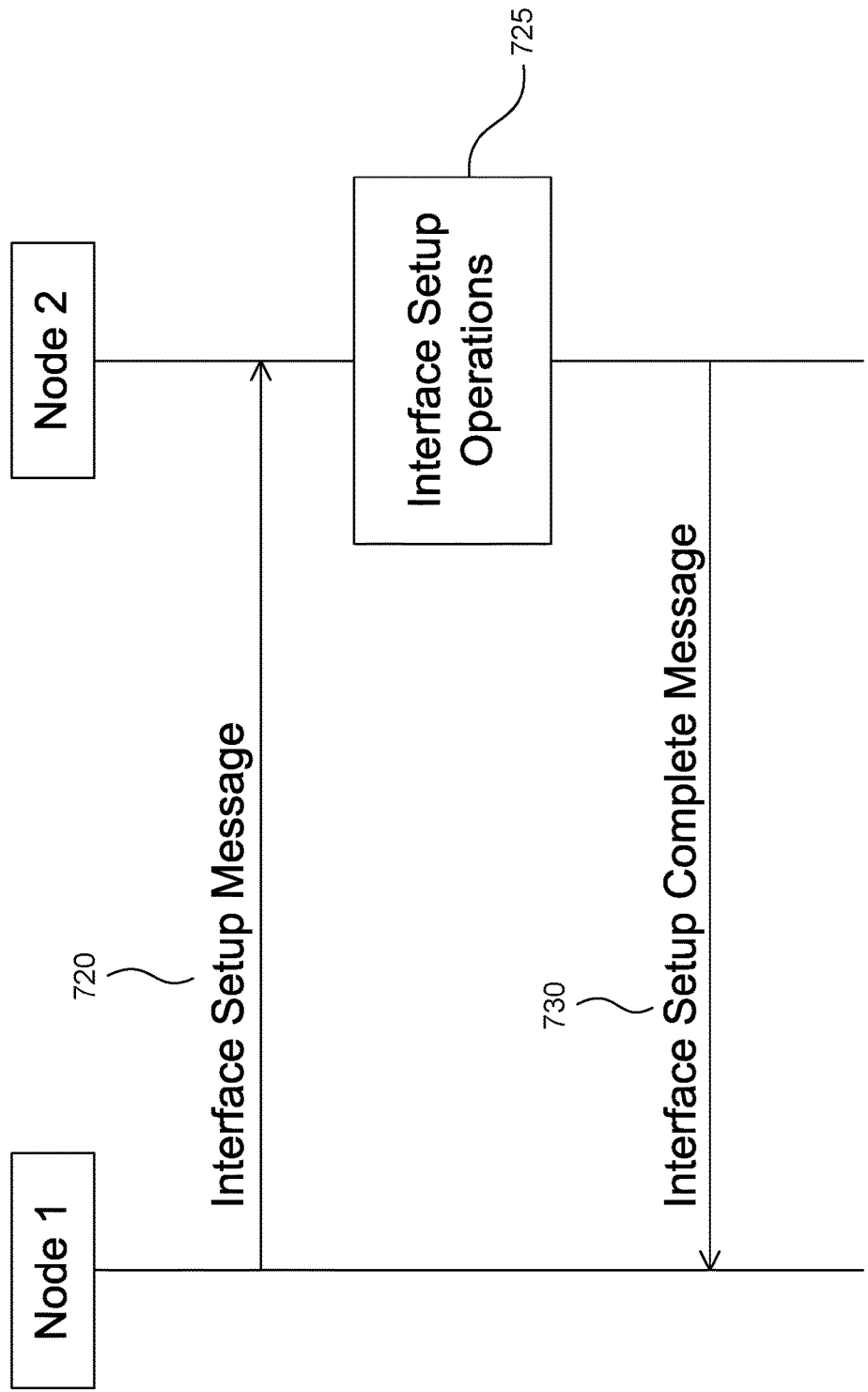
FIG. 7 illustrates explicit associations between keys and sub-interfaces, in accordance with other embodiments of the present invention.

FIG. 7 illustrates AP messaging corresponding to explicit key association according to an embodiment of the present invention. The messaging can occur between nodes 1 and 2, which may be two separate logical nodes such as gNBs. Node 1 transmits 720 an interface setup AP message to node 2. IEs relating to logical node identifiers, e.g. node type and ID, are provided in the interface setup AP message. Node 2 performs operations 725 associated with the interface setup as necessary and transmits 730 an interface setup complete AP message to node 1. Additional IEs related to key association may be provided in the interface setup complete AP message.

In some embodiments, key association updating in response to a redirect operation may occur as follows. A first network entity may transmit a control plane message via a first sub-interface. A given key value is associated with the message. A second network entity may receive the message and determine that a different, second sub-interface should be used to transmit control plane messages associated with the key value. The first and second network entities may reside in different logical nodes, for example. The second network entity may then perform an explicit or implicit redirect operation.

In an explicit redirect operation, the second network entity may transmit a redirect message to the first network entity, indicating that the second sub-interface should be used for messages associated with the key value. The first network entity then updates the stored key associations to associate the key value with the second sub-interface.

Figure 8:
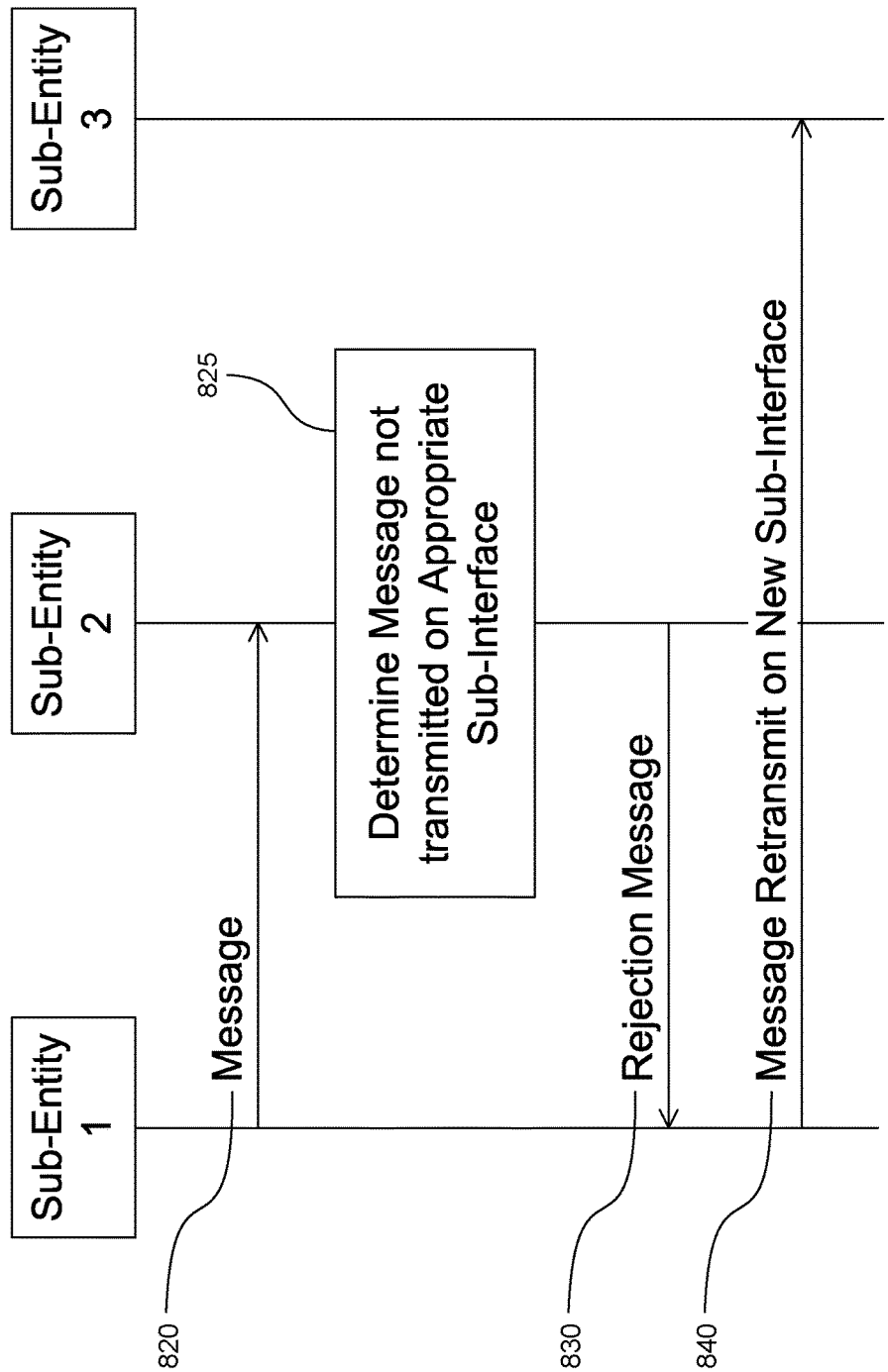
FIG. 8 illustrates associations between keys and sub-interfaces in response to an explicit redirect operation, in accordance with other embodiments of the present invention.

FIG. 8 illustrates an example of key association updating in response to an explicit redirect operation, according to an embodiment of the present invention. Sub-entity 1 transmits 820 a control plane message via a sub-interface which is received by sub-entity 2. Sub-entity 2 determines 825 that the message has not been transmitted on the appropriate sub-interface (i.e. the sub-interface was incorrectly selected by or on behalf of sub-entity 1). Sub-entity 2 then transmits 830 a rejection message back to sub-entity A. The rejection message may indicate that an incorrect sub-interface has been used, and further may indicate the correct sub-interface information to use. The correct sub-interface may be determined by sub-entity 2 for inclusion in the rejection message. Sub-entity 2 may use information obtained via internal communication links of its logical node to make this determination. Sub-entity 1 then retransmits 840 the control plane message using the correct sub-interface information as indicated in the rejection message.

In an implicit redirect operation, the second network entity may encapsulate and forward the message to the target network entity, which may then respond to the first network entity on the appropriate (second) sub-interface. The response may include an indication that the second network entity forwarded the message to the target, for security purposes. The first network entity then updates the stored key associations to associate the key value with the second sub-interface.

Figure 9:
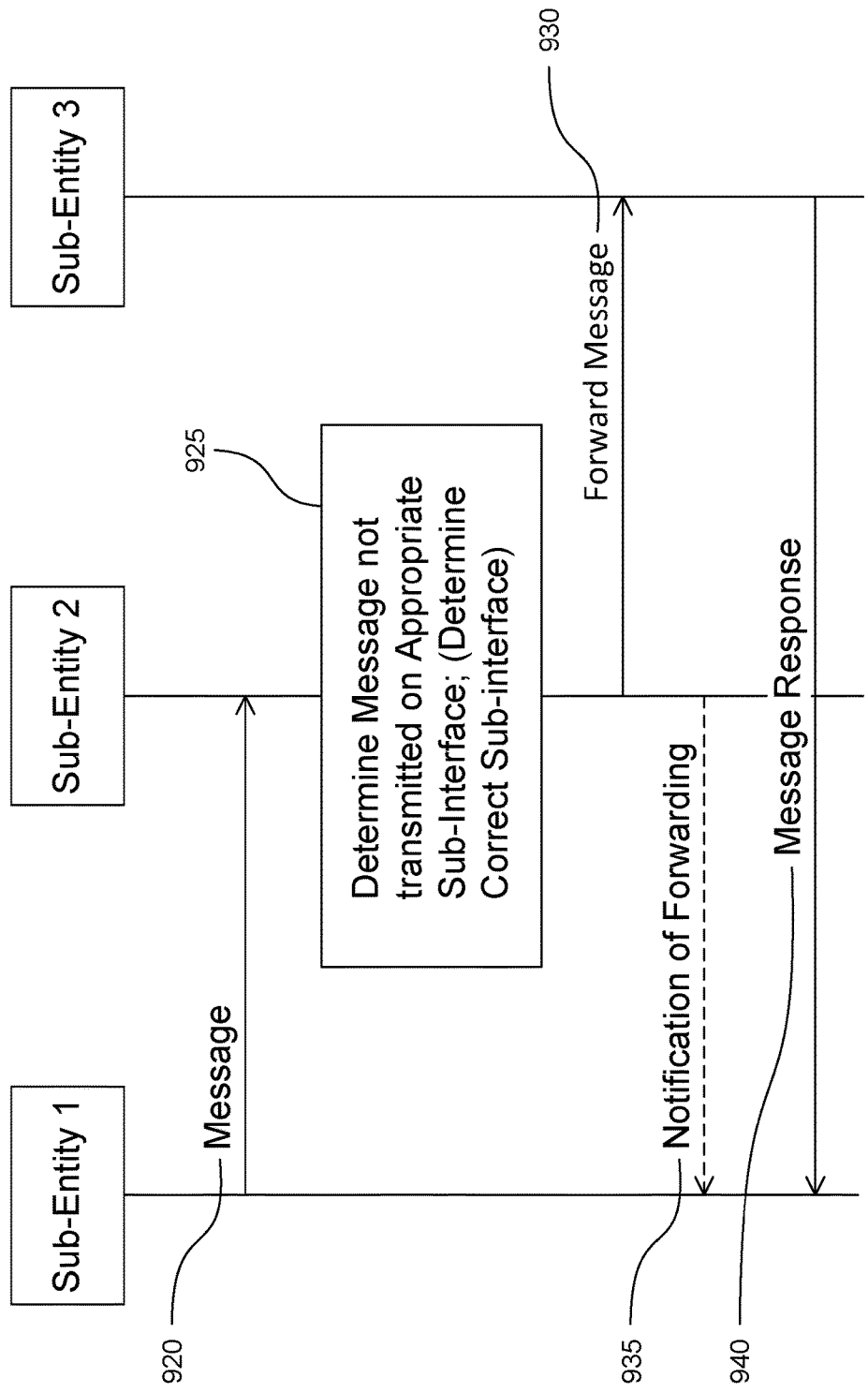
FIG. 9 illustrates associations between keys and sub-interfaces in response to an implicit redirect operation, in accordance with other embodiments of the present invention.

FIG. 9 illustrates an example of key association updating in response to an implicit redirect operation, according to an embodiment of the present invention. Sub-entity 1 originates a message transaction and transmits 920 a control plane message via a sub-interface which is received by sub-entity 2. Sub-entity 2 determines 925 that the message has not been transmitted on the appropriate sub-interface (i.e. determines that the sub-interface was incorrectly selected) and optionally determines the correct sub-interface. Sub-entity 2 then forwards 930 the control plane message to sub-entity 3, e.g. via the correct sub-interface or another channel or interface internal to the logical node containing sub-entities 2 and 3. The forwarding may comprise encapsulating the message in a message forward transfer, along with an indication of the originator of the message transaction. Optionally, sub-entity 2 may also transmit 935 a notification message to sub-entity 1 indicating that the message is being forwarded to sub-entity 3. Sub-entity 3 receives the forwarded message and transmits 940 a response to sub-entity 1. The response includes an indication that the response was triggered due to receipt of the message from sub-entity 2.

Key to sub-interface association will now be discussed. Entities are provided with access to associations between keys and sub-interfaces, for example via use of internal or locally accessible memory. An entity is responsible for determining the appropriate sub-interface corresponding to a particular key or set of keys. In some embodiments, a particular control plane message may be associated with (e.g. include) multiple key values. Potentially, different key values of the message may be associated in memory with a different sub-interface. For example, a UE ID key value may be associated with one sub-interface while a Cell ID key value may be associated with a different sub-interface. This can lead to ambiguity regarding which sub-interface to use for transmitting the message.

To address this issue, in one embodiment, a prioritization ordering of key parameters is defined. Key parameters refer to types of key values. If there are multiple stored associations between sub-interfaces and key parameters relevant to a message, the stored association corresponding to the highest-priority key parameter is selected, and the sub-interface indicated by this stored association is used. In one embodiment, an entity may be configured to perform a sequence of lookup operations, in order, and uses the first sub-interface that is returned by one of the lookup operations. Alternatively, lookup operations may be performed concurrently and the association corresponding to the highest-priority key parameter may be selected.

An example prioritization of key parameters is as follows, with key parameters being listed in order of priority: PDU Session ID; UE ID; Cell ID; Slice ID; Message Type; and Interface Type. Thus, for example, if a sub-entity includes associations related to both the PDU Session ID and the UE ID, the sub-entity would select the sub-interface associated with the PDU Session ID. Prioritization orders can be set programmatically. Prioritization orders can be fixed or can change based on other input parameters or operating context.

In some embodiments, combinations of two or more key parameters may be grouped together and associated with a sub-interface. Sets of multiple keys can then be associated with sub-interfaces, the associations being stored in memory. For example, a given UE ID value along with a given slice ID value may be associated with a given sub-interface, the association being stored in memory. The prioritization ordering of key parameters (as described above) may include sets of multiple key parameters, for example as higher priorities. For example, a prioritization order may include the following, with key parameters being listed in order of priority, and brackets used to indicate multiple key parameters taken as sets: {UE ID, Slice ID}; UE ID; Slice ID.

In some embodiments, a sub-interface can be selected based in part on a history of associations between key values and sub-interfaces. The history may indicate the times at which associations were generated, the triggers which caused associations to be generated, or both. For example, if a control plane message includes two different key values (e.g. a UE ID and a slice ID) which are associated in memory with two different sub-interfaces, the sub-interface corresponding to the most recently entered association may be selected. As another example, associations made using implicit key association may be selected over associations made using explicit key association.

Figure 10:
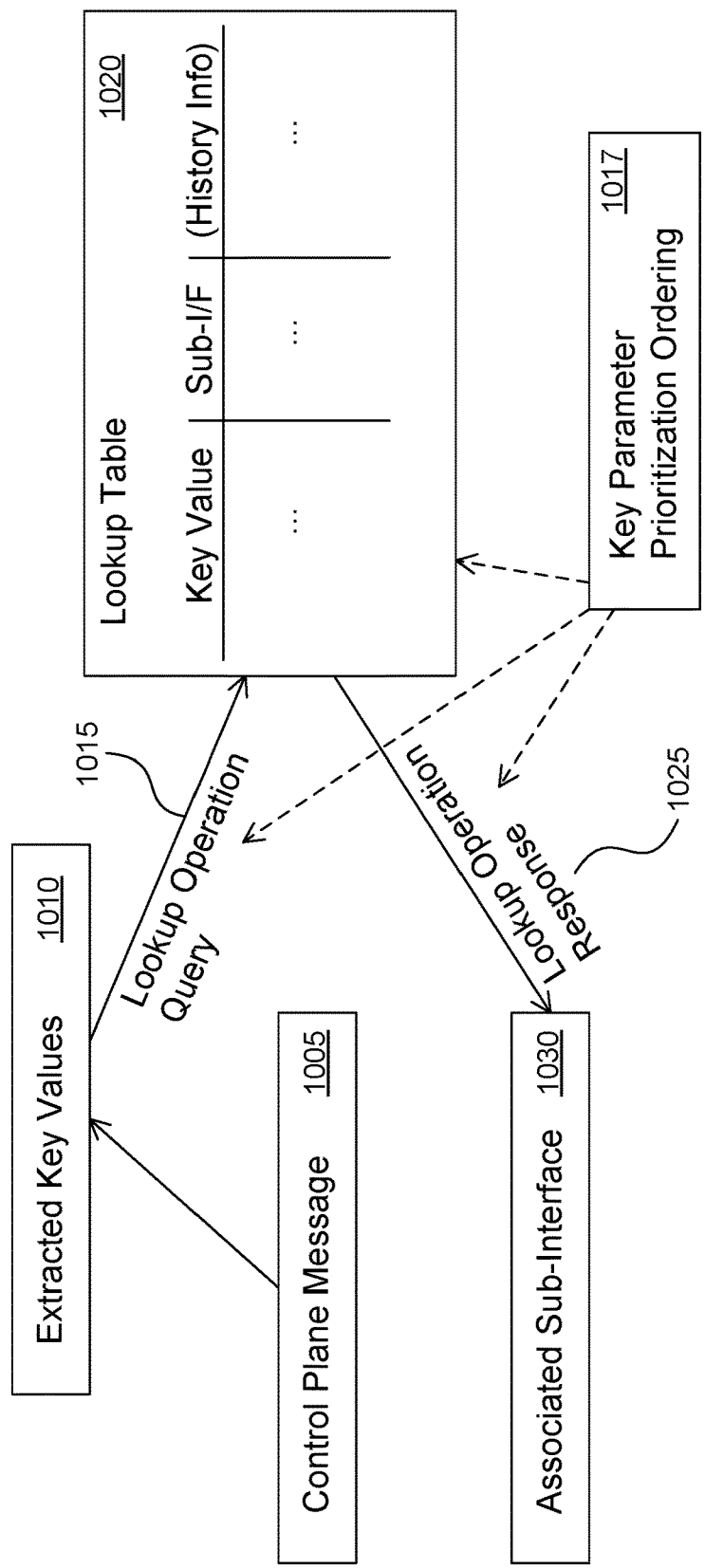
FIG. 10 illustrates associations between keys and sub-interfaces in response to an implicit redirect operation, in accordance with other embodiments of the present invention.

FIG. 10 illustrates an example of key to sub-interface association, according to an embodiment of the present invention. A control plane message 1005 to be transmitted is provided, and key values 1010 are extracted from the control plane message. A lookup operation query 1015 is then generated which specifies one or more of the extracted key values. The lookup operation query operates on a lookup table 1020 which holds stored associations between key values and sub-interfaces, optionally along with information indicative of the history of associations between key values and sub-interfaces. A sub-interface 1030 associated with the specified key values is provided in a lookup operation response 1025. In some embodiments, a stored key parameter prioritization 1017 is used to control which sub-interface associated is returned by the lookup operation, in the case that there are multiple sub-interfaces associated with the extracted key values.

In some embodiments, an interface (e.g. an SCTP interface) between a first logical node and a second logical node is associated with an intermediate entity, referred to herein as a middle box, belonging to the second logical node. In some embodiments, some or all sub-interfaces of the interface are associated with the intermediate entity. A similar middle box may be provided in the first logical node for communication in the opposite direction. The middle box receives (terminates) messages from the first logical node via the interface. The middle box determines which sub-entity of the second logical node to forward received messages to, for example based on key values in the message or other information. The middle box may forward messages via internally defined interfaces of the second logical node. In various embodiments, the middle box performs traffic routing to the correct sub-interface, the correct TNL address, or a combination thereof.

In some embodiments, a middle box is provided in a logical node for each sub-interface associated with that logical node. Middle boxes can be located in the network so that they are close to another logical node from which messages to the middle box are expected to be received. This closeness may be in terms of signal path length, propagation delay, number of hops, or similar network distance metrics. As such, the use of (e.g. standardized) logical node to logical node interfaces (e.g. SCTP) is limited, because of the limited path length between the middle box and the other logical node communicating therewith. In some embodiments, the middle box may be co-located with one or more sub-entities of the other logical node.

Figure 11:
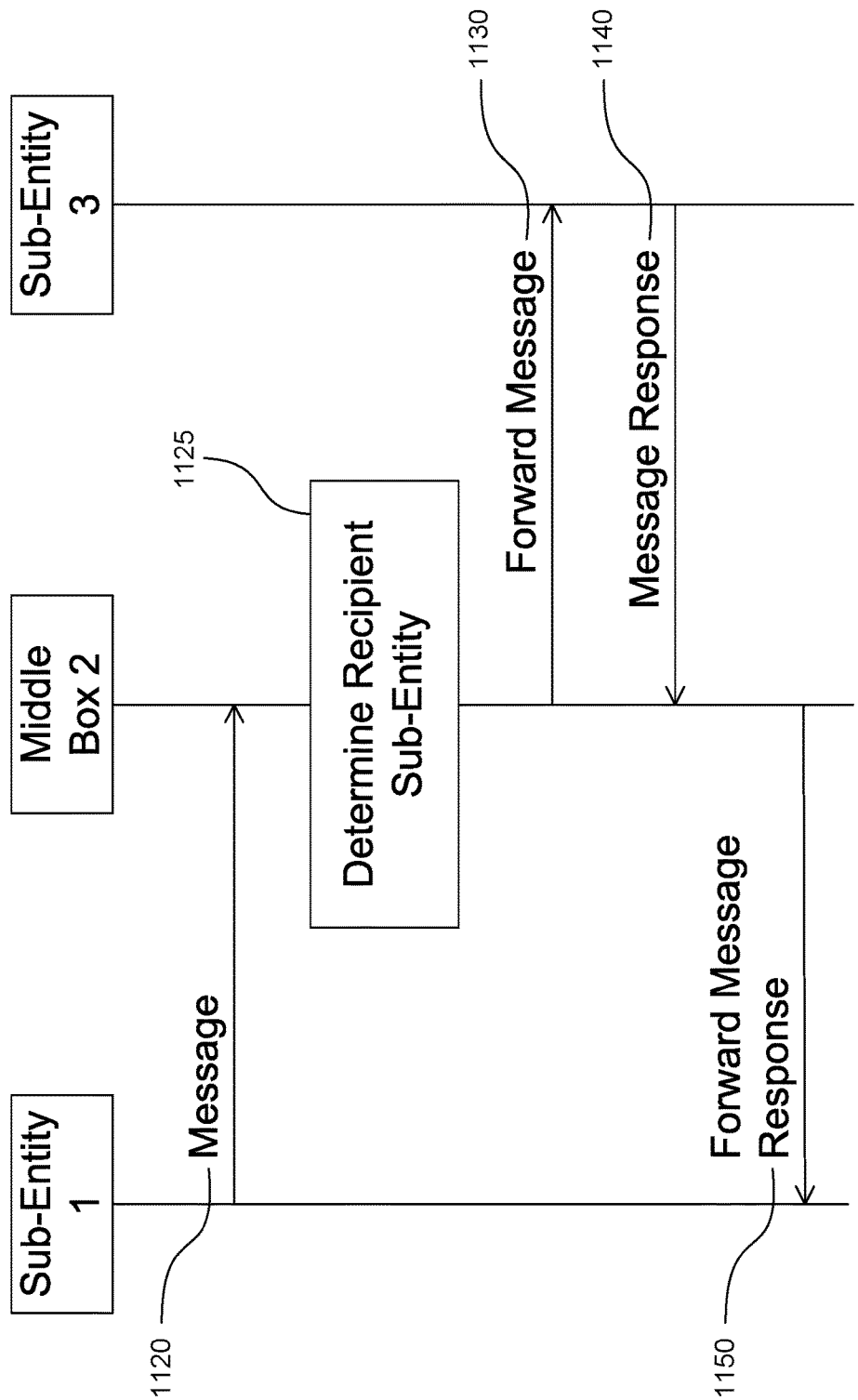
FIG. 11 illustrates operation of a middle box acting as an intermediary between sub-entities, in accordance with embodiments of the present invention.

In some embodiments, the middle box acts, on an ongoing basis, as the intermediary for control plane messages to sub-entities, from sub-entities, or both. For example, as illustrated in FIG. 11, a sub-entity 1 of a first logical node transmits 1120 a control plane message which is received by the middle box 2 belonging to a second, different logical node. The message may be transmitted via an interface coupling the logical nodes, such as an SCTP interface. The middle box 2, being internal to the second logical node, can determine 1125 the appropriate recipient sub-entity 3 (also belonging to the second logical node) for the message. The middle box 2 then forwards 1130 the message to the recipient sub-entity 3. The forwarded message may potentially indicate the originator of the message, i.e. sub-entity 1. If required, the sub-entity 3 responds to the control plane message by transmitting 1140 a message response to the middle box 2, the response potentially designating sub-entity 1 as the intended recipient. The middle box 2 then forwards 1150 the message response to sub-entity 1. Further control plane messages from sub-entity A may be similarly transmitted via the middle box 2. Optionally, the middle box 2 may also transmit a notification message to sub-entity 1 indicating that the control plane message is being forwarded to sub-entity 3.

Figure 12:
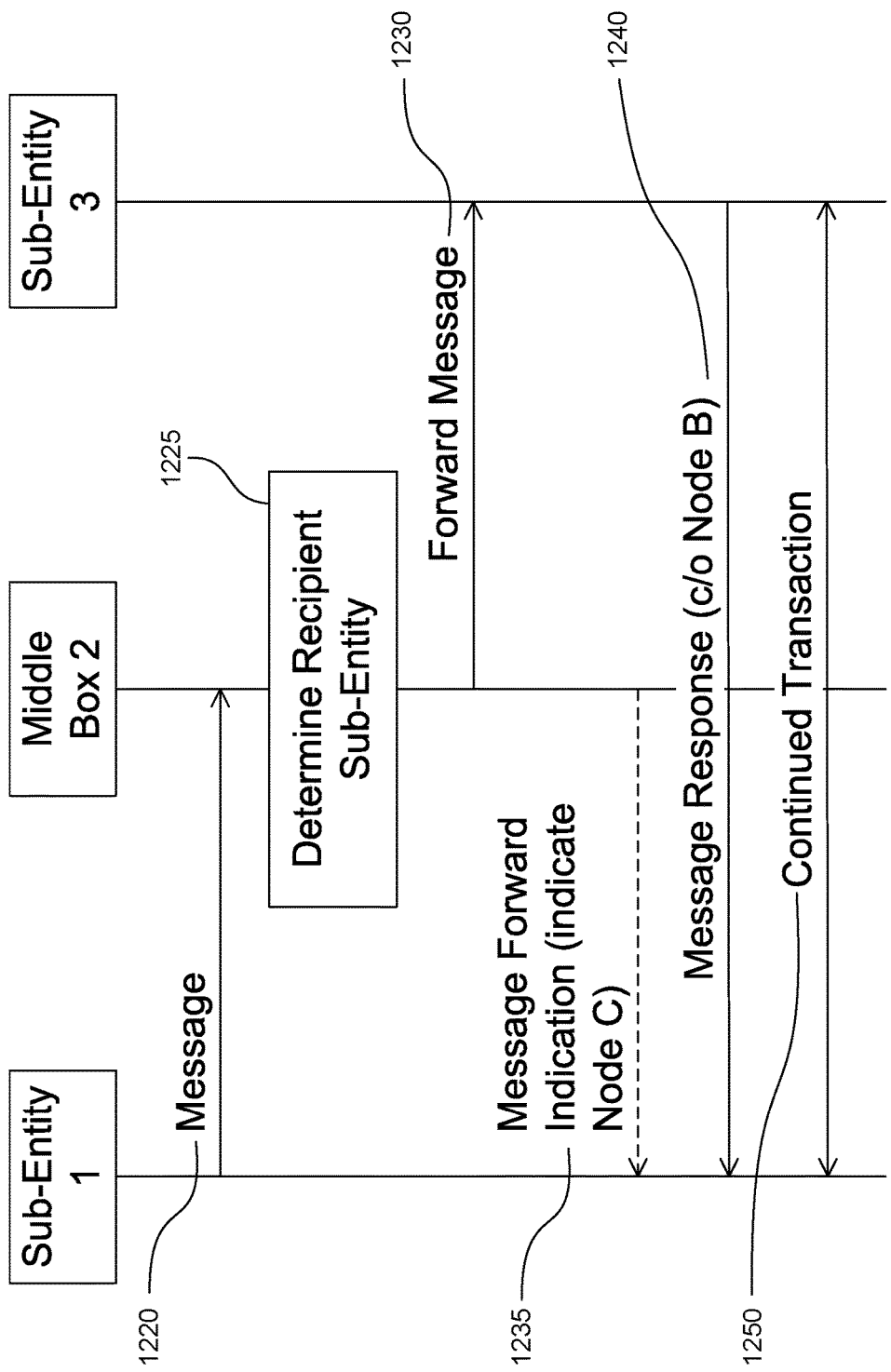
FIG. 12 illustrates operation of a middle box initially acting as an intermediary between sub-entities, in accordance with other embodiments of the present invention.

In some embodiments, the middle box initially acts as the intermediary for control plane messages but is disintermediated from messaging after a certain number of messages, for example after the first control plane message response is received by the initiator of the transaction. For example, as illustrated in FIG. 12, a sub-entity 1 of a first logical node transmits 1220 a control plane message which is received by the middle box 2 belonging to a second logical node. The control plane message may be addressed to the middle box 2 or otherwise intercepted by the middle box 2. The middle box 2, being internal to the second logical node, can determine (identify) 1225 the appropriate recipient sub-entity 3 for the message. The middle box 2 then forwards 1230 the message to the recipient sub-entity 3. The forwarding may occur via an internal interface of the first logical node. The forwarded message indicates the originator of the message, i.e. sub-entity 1, including details on how to communicate with sub-entity 1 (e.g. associated TNL parameters of sub-entity 1). If required, the sub-entity 3 responds to the control plane message by transmitting 1240 a message response to sub-entity 1. The middle box 2 does not have to receive and forward the message response, rather the middle box 2 may be bypassed (disintermediated) from further communication. The message response may indicate, for security purposes, that it is in response to the message as forwarded by the middle box 2. The message response may also include details on how to communicate with sub-entity 3. Further control plane messages 1250 between sub-entity 1 and sub-entity 3 can be transmitted directly, rather than through the middle box 2. This is facilitated by the initial exchange of information indicative of how to communicate with the sub-entities 1 and 3. In some embodiments, prior to, during, or following forwarding 1230 the message to the recipient sub-entity 3, the middle box 2 may transmit 1235 a message to sub-entity 1 indicating that the message is being forwarded. This message may include an indication of the identity of sub-entity 3. Such a message may be used for security purposes, for example, in order to authorize sub-entity 3 to sub-entity 1.

In some embodiments, a respond-to-query solution is implemented, in which a sub-entity can initiate communication with another logical node. The logical node is configured to respond to the entity or sub-entity which most recently communicated with the logical node.

Embodiments of the present technology can be carried out by a device (node, entity or function) within a wireless communication network (RAN or core). A device within a wireless communication network can be a real or virtualized networked device. Processing circuitry is used to direct operation of a relevant device, and can also be referred to as control circuitry or simply circuitry. The circuitry may include a microcontroller operatively coupled to memory, the memory including program instructions for execution by the microcontroller. The circuitry may include other digital electronics, analog electronic circuitry, or a combination thereof, such as an application specific integrated circuit (ASIC), digital logic, etc.

Through the descriptions of the preceding embodiments, the present invention may be implemented by using hardware only or by using software for execution on a hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, ROM, persistent RAM, or other non-transitory storage medium. The software product includes a number of instructions that enable a wireless connecting computing device to execute the methods provided in the embodiments of the present invention. The software product may include a number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations of the described embodiments with other embodiments can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for operating an apparatus of a wireless communication network to transmit a control plane message, the apparatus being one of a plurality of separate, networked sub-entities of a first logical node, the method comprising:
    selecting a sub-interface from a plurality of available sub-interfaces, the plurality of available sub-interfaces coupling the first logical node with a second logical node and wherein each of the plurality of available sub-interfaces is associated with a set of transport network layer (TNL) parameters for communicating with a different corresponding one of the plurality of separate, networked sub-entities, of the second logical node, that is an intended recipient of the control plane message, and wherein the sub-interface is selected based on one or more keys extracted from the control plane message;
    configuring one or more packets to carry the control plane message using the set of TNL parameters associated with the selected sub-interface; and
    transmitting the one or more packets using the selected sub-interface.

2. The method of claim 1, further comprising: receiving a prior control plane message; and setting an association between the selected sub-interface and the one or more keys in response to the prior control plane message.

3. The method of claim 1, wherein the apparatus performs selecting, configuring, transmitting in response to a trigger to transmit the control plane message.

4. The method of claim 2, wherein the prior control plane message is transmitted over the selected sub-interface and includes the one or more keys.

5. The method of claim 2, wherein the prior control plane message is an explicit instruction to associate the selected sub-interface with the one or more keys, or wherein the prior control plane message is a response to a further prior control plane message transmitted from the apparatus using a different sub-interface.

6. The method of claim 1, wherein the one or more keys include one or more of: a user equipment (UE) identifier (ID); a cell ID; a network slice ID; a protocol data unit (PDU) session ID; a message type; and an interface type.

7. The method of claim 1, wherein two or more keys are extracted from the control plane message, each of the two or more keys or combinations thereof associated with a different one of the plurality of available sub-interfaces, and wherein selecting the sub-interface comprises selecting the sub-interface corresponding with a highest priority one of the two or more keys or combinations thereof.

8. The method of claim 1, further comprising creating at least one of the plurality of sub-interfaces.

9. The method of claim 1, further comprising: retrieving, from memory, associations between the plurality of sub-interfaces and corresponding keys; and selecting the sub-interface based on the retrieved associations.

10. The method of claim 1, further comprising communicating with a second apparatus of the first logical node to exchange information indicative of an association between the one or more keys and the sub-interface, the second apparatus being a second one of the plurality of separate, networked sub-entities of the first logical node, the sub-interface being selected based on the one or more keys in accordance with the association.

11. The method of claim 1, further comprising:
receiving one or more packets sent by a sub-interface of one of the networked sub-entities of the second logical node, the one or more packets carrying a second control plane message;
extracting one or more keys from the second control plane message; and
selecting one of the plurality of available sub-interfaces based on the one or more keys for communication with the sub-interface of the one of the networked sub-entities of the second logical node.

12. An apparatus operating in a wireless communication network, the apparatus being one of a plurality of separate, networked sub-entities of a first logical node and configured to transmit a control plane message, the apparatus comprising:
a processor coupled to the network interface, the processor configured to:
select a sub-interface from a plurality of available sub-interfaces, the plurality of available sub-interfaces coupling the first logical node with a second logical node and wherein each of the plurality of available sub-interfaces is associated with a set of transport network layer (TNL) parameters for communicating with a different corresponding one of the plurality of separate, networked sub-entities of the second logical node, that is an intended recipient of the control plane message, and wherein the sub-interface is selected based on one or more keys extracted from content of the control plane message;
configure one or more packets to carry the control plane message using the TNL parameters of the selected sub-interface; and
transmit the one or more packets using and the selected sub-interface.

13. The apparatus of claim 12, wherein the processor is further configured to: receive a prior control plane message; and set an association between the selected sub-interface and the one or more keys in response to the prior control plane message.

14. The apparatus of claim 12, wherein the processor is further configured to select, configured, and transmit the control plane message in response to a trigger to transmit the control plane message.

15. The apparatus of claim 13, wherein the prior control plane message is transmitted over the selected sub-interface and includes the one or more keys.

16. The apparatus of claim 13, wherein the prior control plane message is an explicit instruction to associate the selected sub-interface with the one or more keys, or wherein the prior control plane message is a response to a further prior control plane message transmitted from the apparatus using a different sub-interface.

17. The apparatus of claim 12, wherein the one or more keys include one or more of: a user equipment (UE) identifier (ID); a cell ID; a network slice ID; a protocol data unit (PDU) session ID; a message type; and an interface type.

18. The apparatus of claim 12, wherein two or more keys are extracted from control plane message, each of the two or more keys or combinations thereof associated with a different one of the plurality of available sub-interfaces, and wherein selecting the sub-interface comprises selecting the sub-interface corresponding with a highest priority one of the two or more keys or combinations thereof.

19. The apparatus of claim 12, wherein the processor is further configured to create at least one of the plurality of sub-interfaces.

20. The apparatus of claim 12, wherein the first logical node is a generalized NodeB (gNB).

21. The apparatus of claim 20, wherein the one of a plurality of separate, networked sub-entities of a first logical node sub-entity is a control unit of the gNB, a distributed unit of the gNB, a transmission/reception point of the gNB, a physical communication equipment of the gNB, or a scheduler of the gNB.

22. The apparatus of claim 12, wherein the processor is further configured to retrieve, from memory, associations between the plurality of sub-interfaces and corresponding keys; and select the sub-interface based on the retrieved associations.

23. The apparatus claim 12, wherein the processor is further configured to communicate with a second apparatus of the first logical node to exchange information indicative of an association between the one or more keys and the sub-interface, the second apparatus being a second one of the plurality of separate, networked sub-entities of the first logical node, the sub-interface being selected based on the one or more keys in accordance with the association.

24. The apparatus claim 12, wherein the processor is further configured to
receiving one or more packets sent by a sub-interface of one of the networked sub-entities of the second logical node, the one or more packets carrying a second control plane message;
extracting one or more keys from the second control plane message; and
selecting one of the plurality of available sub-interfaces based on the one or more keys for communication with the sub-interface of the one of the networked sub-entities of the second logical node.

* * * * *